(12) United States Patent
Augenstein et al.

(10) Patent No.: US 7,865,473 B2
(45) Date of Patent: Jan. 4, 2011

(54) GENERATING AND INDICATING INCREMENTAL BACKUP COPIES FROM VIRTUAL COPIES OF A DATA SET

(75) Inventors: Oliver Augenstein, Dettenhausen (DE); Dale Murray McInnis, Aurora (CA); Andreas Uhl, Ehningen (DE); Chrisopher Zaremba, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 524 days.

(21) Appl. No.: 11/695,544

(22) Filed: Apr. 2, 2007

(65) Prior Publication Data

US 2008/0243954 A1  Oct. 2, 2008

(51) Int. Cl.
*G06F 7/00* (2006.01)
*G06F 17/00* (2006.01)
*G06F 11/00* (2006.01)
*G06F 13/00* (2006.01)
*G06F 13/28* (2006.01)

(52) U.S. Cl. .................. 707/645; 707/646; 714/20; 711/162; 711/202

(58) Field of Classification Search ............... 707/204, 707/645, 646; 714/20; 711/162, 202
See application file for complete search history.

(56) References Cited

U.S. PATENT DOCUMENTS

| | | | | |
|---|---|---|---|---|
| 5,835,953 A * | 11/1998 | Ohran | ....................... | 711/162 |
| 6,212,531 B1 * | 4/2001 | Blea et al. | ................... | 707/204 |
| 6,223,269 B1 * | 4/2001 | Blumenau | ................... | 711/202 |
| 6,604,118 B2 | 8/2003 | Kleiman et al. | | |
| 6,647,399 B2 * | 11/2003 | Zaremba | ...................... | 707/204 |
| 6,665,815 B1 * | 12/2003 | Goldstein et al. | ............. | 714/20 |
| 6,907,505 B2 * | 6/2005 | Cochran et al. | ............. | 711/162 |
| 6,938,056 B2 | 8/2005 | Burns et al. | | |
| 6,996,586 B2 | 2/2006 | Stanley et al. | | |
| 7,069,402 B2 | 6/2006 | Coulter et al. | | |
| 7,158,991 B2 * | 1/2007 | Kekre et al. | ................. | 707/102 |
| 7,487,310 B1 * | 2/2009 | Bingham et al. | ............ | 711/162 |
| 7,756,833 B2 * | 7/2010 | Van Ingen et al. | ........... | 707/640 |
| 2005/0071379 A1 | 3/2005 | Kekre et al. | | |
| 2005/0086195 A1 | 4/2005 | Tan et al. | | |
| 2006/0106893 A1 | 5/2006 | Daniels et al. | | |

OTHER PUBLICATIONS

N. Garimella, "Understanding and Exploiting Snapshot Technology for Data Protection, Part 1:Snapshot Technology Overview", IBM Corp., Apr. 2006, pp. 1-8.

N. Garimella, et al., "Understanding IBM Tivoli Storage Manager for Advanced Copy Services: Data Protection for DB2 UDB, Part 1: Product Overview and advanced Data Protection Concepts", IBM Corp., May 2006, pp. 1-9.

* cited by examiner

*Primary Examiner*—James Trujillo
*Assistant Examiner*—Cheryl M Shechtman
(74) *Attorney, Agent, or Firm*—David W. Victor; Konrad Raynes and Victor LLP

(57) ABSTRACT

Provided are a method, system, and program for generating and indicating incremental backup copies from virtual copies of a data set. A virtual copy operation is initiated to create a virtual copy of a data set, wherein the virtual copy represents the data set at a point-in-time copy, and wherein the virtual copy is completed without transferring the data set to a backup location. An incremental backup operation is initiated with respect to an identified virtual copy, wherein the incremental backup operation copies changes to the data set that occur since a most recent creation of an incremental backup set.

18 Claims, 6 Drawing Sheets

Virtual Copy Information

Incremental Backup Information

GENERATING AND INDICATING INCREMENTAL BACKUP COPIES FROM VIRTUAL COPIES OF A DATA SET

BACKGROUND OF THE INVENTION

1. Field of the Invention

The present invention relates to a method, system, and program for generating and indicating incremental backup copies from virtual copies of a data set

2. Description of the Related Art

In many systems, data on one storage system may be copied to the same or another storage system so that access to data volumes can be provided from two different storage systems. A point-in-time copy involves physically copying all the data from source volumes to target volumes so that the target volume has a copy of the data as of a point-in-time. A point-in-time copy can also be made by logically making a copy of the data and then only copying data over when necessary, in effect deferring the physical copying. This virtual copy operation is performed to minimize the time during which the target and source volumes are inaccessible.

With a virtual copy operation, the copy services performing the virtual copy create metadata and data structures providing a logical representation of source data as a point in time. The virtual copy is completed almost instantly, in the time taken to create the metadata and data structures and is completed without any physical copying of the data. If the source data subject to a virtual copy is updated following the creation of the virtual copy, then the original data in the source data is copied to a storage pool maintained for the virtual copy before the data is updated. In this way, the source data as of the point-in-time of the virtual copy may be reconstructed from the unchanged source data and the original data that was overwritten in the source data maintained in the virtual copy storage pool. Examples of a virtual copy operation include the International Business Machines Corporation's® Snapshot copy and FlashCopy® operations. (FlashCopy and International Business Machines are registered trademarks of International Business Machines Corp. in the United States and other countries).

A user or application may also use a database or other program to create incremental backups of source data. An incremental backup is performed with respect to a base data set, comprising a full copy of a data set at an initial point-in-time, and includes data that has changed since the full copy of the data set or a most recently created incremental backup set. In this way, the incremental backup set includes only data that has changed since the last created full or incremental backup set.

There is a need in the art to utilize both virtual copy and incremental backup operations in a backup environment.

SUMMARY

Provided are a method, system, and program for generating and indicating incremental backup copies from virtual copies of a data set. A virtual copy operation is initiated to create a virtual copy of a data set, wherein the virtual copy represents the data set at a point-in-time copy, and wherein the virtual copy is completed without transferring the data set to a backup location. An incremental backup operation is initiated with respect to an identified virtual copy, wherein the incremental backup operation copies changes to the data set that occur since a most recent creation of an incremental backup set.

DETAILED DESCRIPTION

Figure 1:
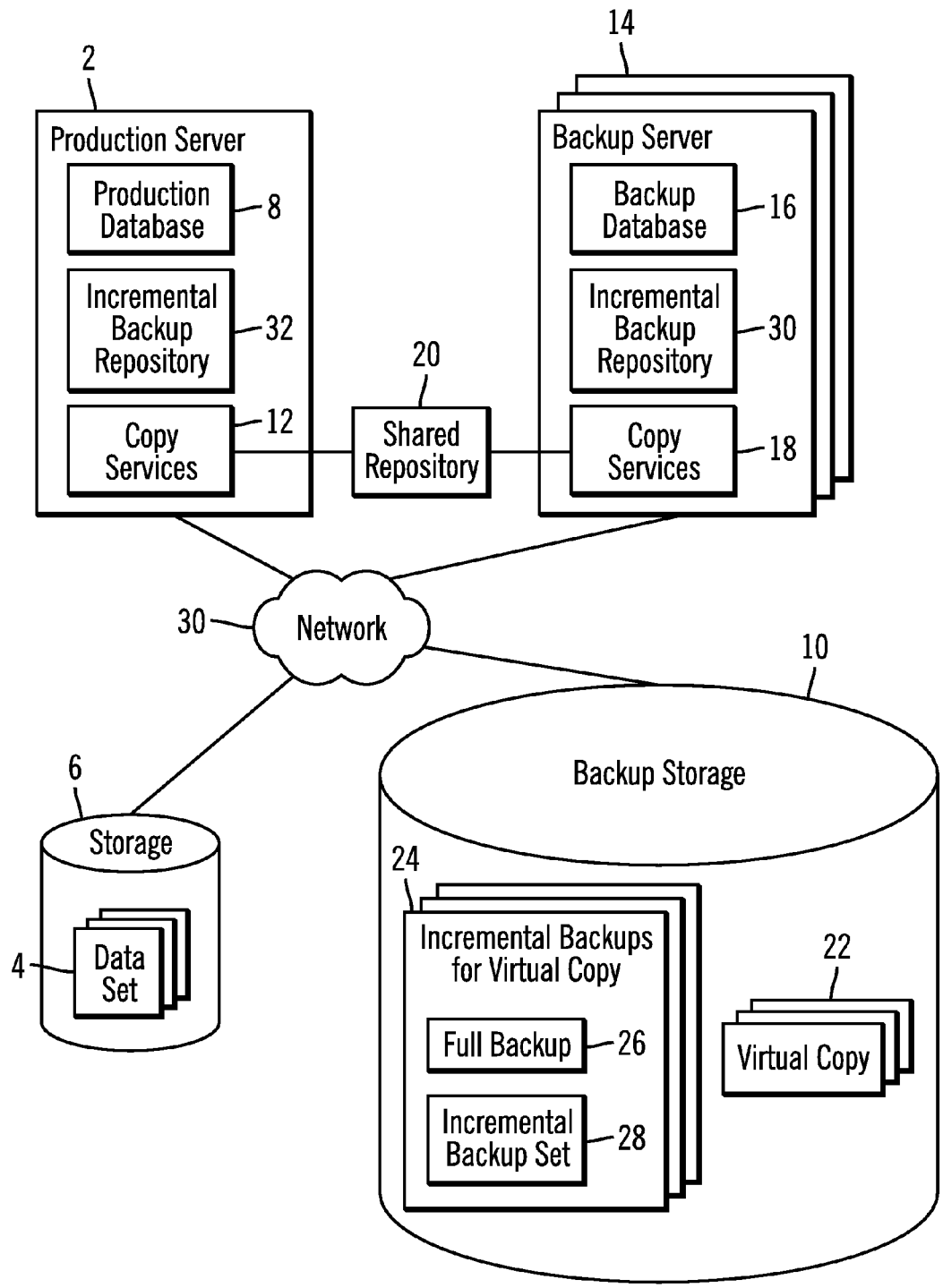
FIG. 1 illustrates an embodiment of a backup computing environment.

FIG. 1 illustrates an embodiment of a network backup computing environment. A production server 2 manages access to data sets 4 in storage 6. The data sets 4 may comprise user data, such as database data, files, application data, etc. The production server 2 includes a production database 8 that maintains information on backups of the data sets 4 maintained in a backup storage 10 and copy services 12 to backup and copy the data sets 4 managed by the production server 2. The copy services 12 may create virtual copies 22 of the data sets 4 and incremental backups 24. A virtual copy 22 comprises a point-in-time copy of a data set that is immediately created without copying the underlying data.

One or more backup servers 14 each include a backup database 16 to maintain information on backed-up data sets 4 and backup copy services 18 to perform backup operations. The backup database 16 (or the backup database 16 and the incremental backup repository 30) may comprise a virtual copy of the production database 8 (or the production database 8 and the incremental backup repository 32). The production copy services 12 and backup copy services 18 may communicate backup related requests and status via a shared repository 20. In one embodiment, a virtual copy 22 of the data set 4 is associated with a backup server 14. In such case, the data in the backup server 14 and the virtual copy 22 comprise the data in the production server 2 and data set 4 at the time the virtual copy was created. In this way, the backup database 16 provides a "historic version" of the production database 8.

The backup database 16 may further be used to create an incremental backup 24 of the data stored within the virtual copy 22. The backup database 16 stores information about an incremental backup created from the virtual copy 22 in a backup incremental backup repository 30. The backup information in the backup incremental backup repository 30 may be stored in the virtual copy 22 of the data sets 4 and thus alter the content of the virtual copy 22 of the data sets 4. The backup database 16 may update the shared repository 20 with information indicating that a successful incremental backup 24 was created from a virtual copy 22. The production database 8 extracts this information from the shared repository 20 and updates an incremental backup repository 32 with the appropriate information on the incremental backup 24 created by the backup server 14. The information on the incremental backup 24 that is stored in the incremental backup repository 32 may be created as if the incremental backup 24 was taken at the time when the virtual copy 22 was created.

The backup information in the production incremental backup repository 32 may be stored in the data sets 4 from which the virtual copy 22 is created.

The production server 2 copy services 12 creates virtual copies 22 maintained in the backup storage 10 of one of the data sets 4 at different points-in-time. After a virtual copy, e.g., Snapshot, FlashCopy®, of a data set 4 is created, original data about to be overwritten in the data set 4 following the point-in-time of the virtual copy is saved in a storage pool, which may be in the backup storage 10. The storage pool maintains the set-aside original data in the data set as of the point-in-time of the virtual copy that is about to be overwritten following the point-in-time.

The backup database 16 may create incremental backups 24 from one virtual copy 22, including a full-backup 26 of the data set 4 as of the point-in-time of the virtual copy 22 and incremental backup sets 28, where each incremental backup set 28 includes data in the data set 4 that has changed since the time of a last incremental backup or the full backup 26. The full backup 26 may be considered as an incremental backup whose point-in-time is the point-in-time of the virtual copy.

A network 30 enables the production 2 and backup servers 14 to communicate with the data storage 6 and backup storage 10. The shared repository 20 may comprise storage included in the production server 2 or backup servers 14 or some other storage device.

The production 2 and backup 14 servers may comprise suitable server class machines or other computational devices. The network 30 may comprise a Local Area Network (LAN), Storage Area Network (SAN), Wide Area Network (WAN), wireless network, direct connection etc. The storages 6 and 10 may be implemented with storage devices known in the art, such as one hard disk drive, a plurality of interconnected hard disk drives configured as Direct Access Storage Device (DASD), Redundant Array of Independent Disks (RAID), Just a Bunch of Disks (JBOD), etc., a tape device, an optical disk device, a non-volatile electronic memory device (e.g., Flash Disk), a tape library, etc. In one embodiment, the storage 6 for the data sets 4 may comprise a relatively high speed storage device, such as hard disk drives. The backup storage 10 may comprise a storage device intended to archive data, such as a tape storage medium, disk drives, etc. In one embodiment, the data sets 4 are maintained in a storage media 6 separate from the storage media 10 storing the virtual copies 22 and incremental backups for virtual copies 24. In a further embodiment, the virtual copies 22 may be stored in a separate storage medium from the storage medium that stores the incremental backup sets 24. For instance, the incremental backups 24 may be stored in a tape storage media and the virtual copies 22 may be stored in a disk drive storage system. In a yet further embodiment, the storage 6, virtual copy 22, and incremental backups 24 may each be implemented on a separate storage device. In a yet still further embodiment, the storage 6 and virtual copy 22 may be implemented one storage device and the incremental backups 14 may be stored on another storage device.

Figure 2:
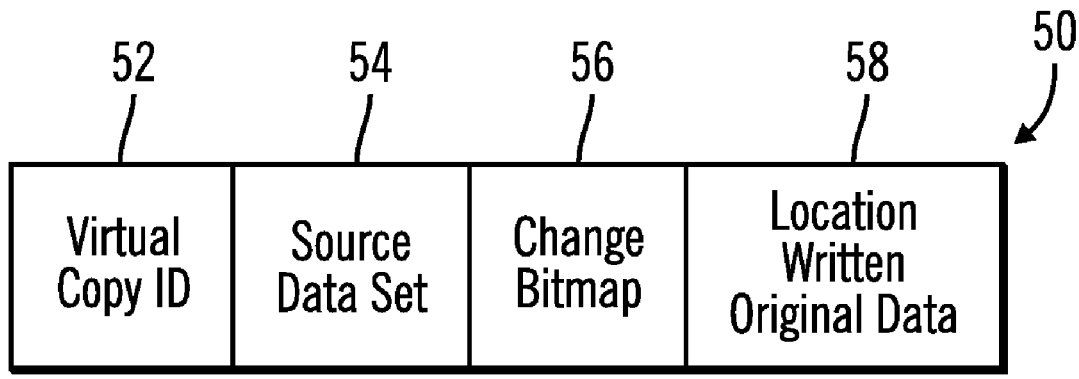
FIG. 2 illustrates an embodiment of virtual copy information known in the prior art.

FIG. 2 illustrates an embodiment of a virtual copy data structure 50 known in the prior art having information on one virtual copy 22a, 22b . . . 22n, including: a unique identifier 52 of the virtual copy; a source data set 54 that is the subject of the virtual copy relationship; a change bitmap 56 or other data structure indicating tracks or other data units, e.g., blocks, in the source data set 54 that have been changed since the point-in-time at which the virtual copy was created; and the location 58 of overwritten data comprising the original data from the source data set 54 that was updated after the point-in-time of the virtual copy. As mentioned, for an active virtual copy, if there is an attempt to overwrite original data in the data set 4 at the point-in-time of the virtual copy, such original data is copied to the location 58 of overwritten data for the virtual copy so that the virtual copy maintains the data as of the point-in-time.

Figure 3:
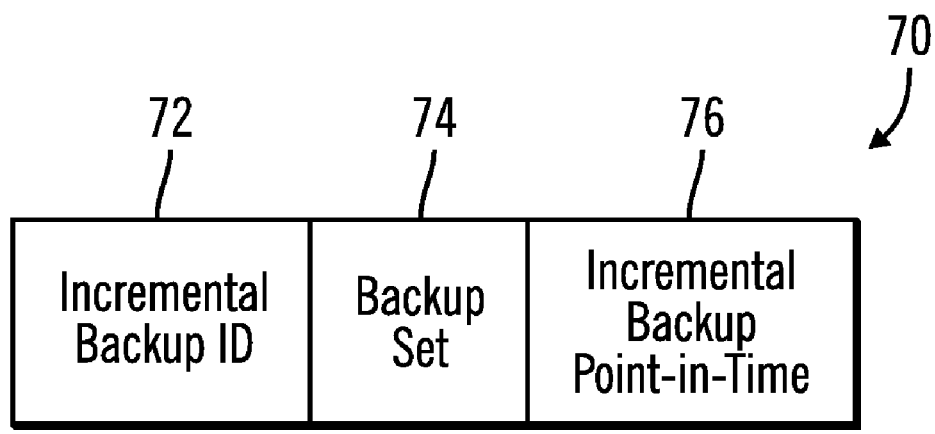
FIG. 3 illustrates an embodiment of incremental backup information with respect to a source virtual copy.

FIG. 3 illustrates an embodiment of incremental backup information 70 maintained in the production 8 and backup 16 databases, including an incremental backup identifier (ID) 72 identifying an incremental backup for the production database 8; a backup set 74 indicating a full backup 26 or an incremental backup set 28, which can be created from a data set 4 directly or from a virtual copy 22; and an incremental backup point-in-time 76 indicating the time at which the incremental backup was created, such that the incremental backup set includes changes to the data set 4 represented by the source virtual copy 74 between the point-in-time of the most recent previous incremental backup and the incremental backup point-in-time 76. In one embodiment the incremental backup point-in-time may comprise a LSRN (log record sequence number) which uniquely identifies a point-in-time of the data set 4.

Figure 4:
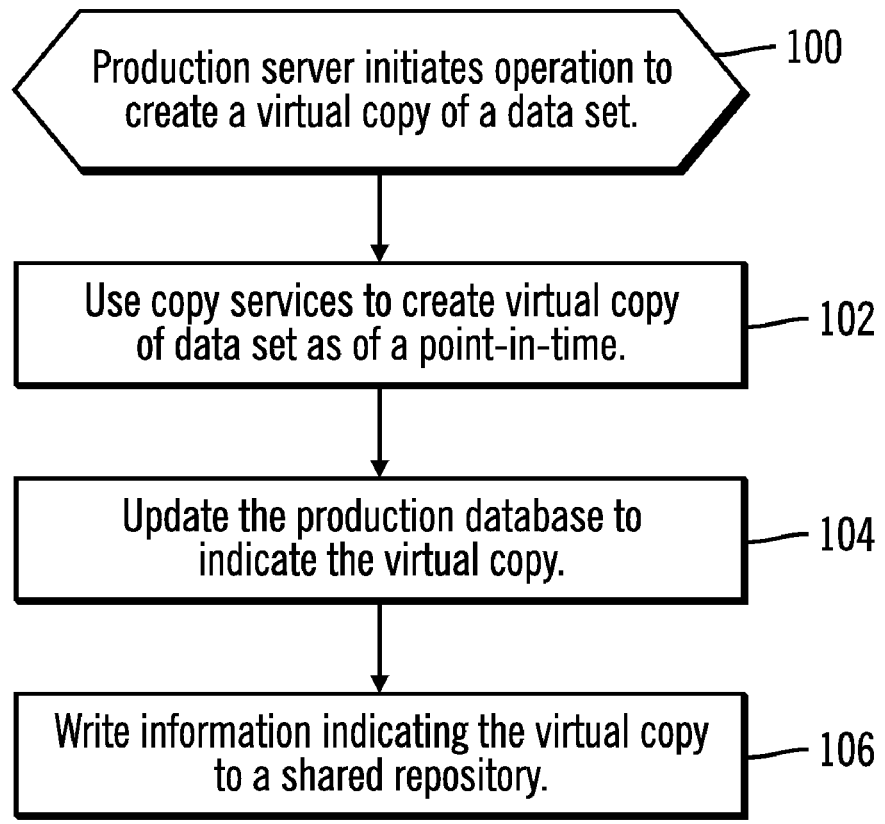
FIG. 4 illustrates an embodiment of operations by a production server to create a virtual copy.

FIG. 4 illustrates an embodiment of operations performed at the production server 2 to create a virtual copy 22 of a data set 4 in the storage 6 managed by the production server 2. This virtual copy 22 may be associated with the backup database 16 to use for creating incremental backups for the virtual copy 24. Upon receiving (at block 100) a request to create a virtual copy 22 of a data set 4, which may originate from a user or application program, the production copy services 12 are invoked (at block 102) to create virtual copy 22 of data set 4 as of a point-in-time. The production database 8 may be updated (at block 104) to indicate the virtual copy 22. The copy services 12 (or production server 2) may further write (at block 104) information indicating the virtual copy 22, such as the virtual copy information 50 (FIG. 2), to the shared repository 20.

Figure 5:
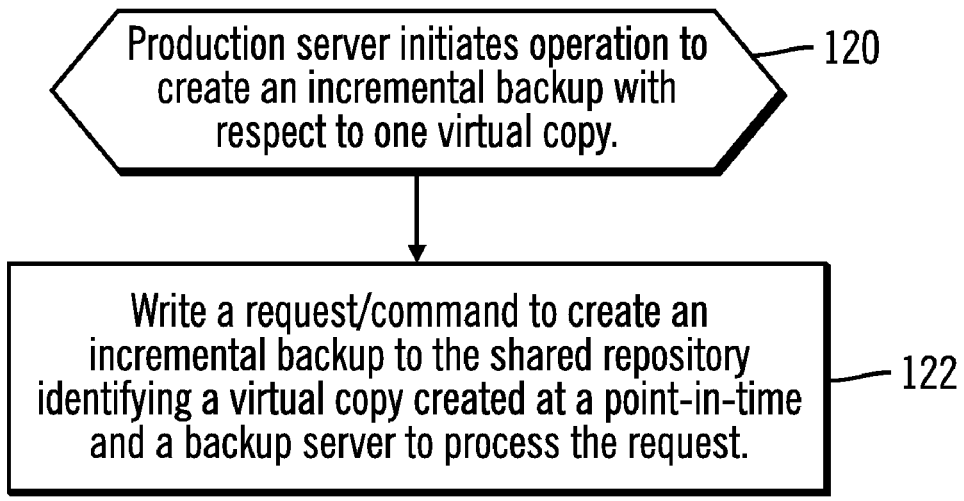
FIG. 5 illustrates an embodiment of operations by a production server to create an incremental backup.

FIG. 5 illustrates an embodiment of operations performed at the production server 2 to create an incremental backup 26, 28 for a virtual copy 22. Upon the copy services 12 (or production database 8) receiving (at block 120) a request to create an incremental backup for a virtual copy 22, which may originate from a user or application program, the copy services 12 (or production database 8) writes (at block 122) a request/command to create an incremental backup to the shared repository 20. The incremental backup command identifies a virtual copy 22 representing a source data set 4 as of a point-in-time, which is the base set for the incremental backups, and a backup server 14 to process the request.

Figure 6:
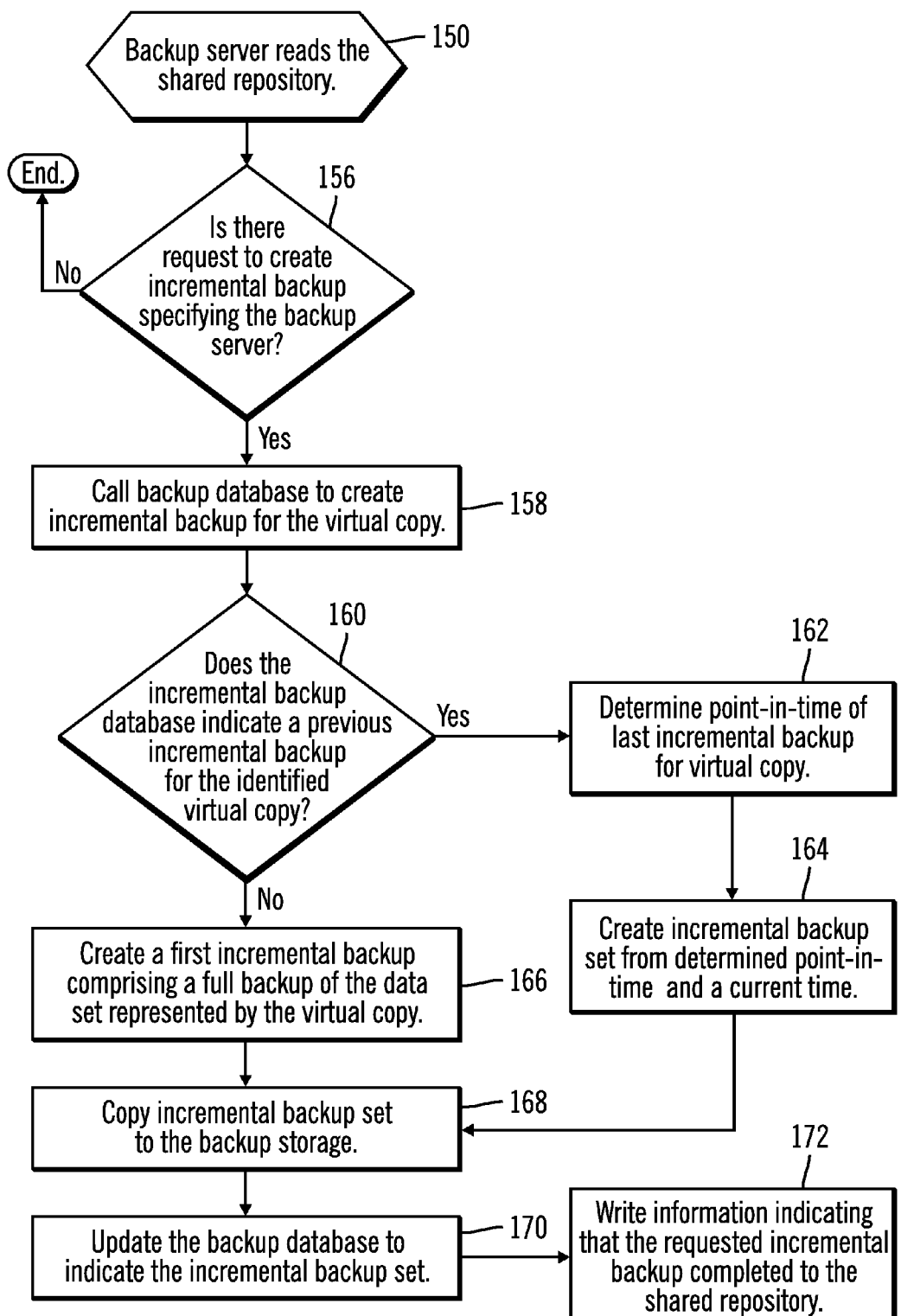
FIG. 6 illustrates an embodiment of operations by a backup server to read a shared repository and generate an incremental backup set.

FIG. 6 illustrates an embodiment of operations performed by the backup server 14 copy services 18 to read the shared repository 20. Upon reading (at block 150) the shared repository 20, if (at block 156) there is a request to create an incremental backup specifying the backup server and a virtual copy 22. If not, control ends. Otherwise, if the incremental backup request/command identifies the backup server 14 reading the shared repository 20, then the copy services 18 calls (at block 158) the backup database 16 to perform the incremental backup copy operation. In an alternative embodiment, the copy servers 18 may perform the incremental backup operation, using the backup database 16 to maintain information on incremental backups for virtual copies 24.

The backup database 16, in response to the call, determines (at block 160) whether the backup database 16 identifies an incremental backup for the specified virtual copy, i.e., incremental backup 70 information (FIG. 3) in the backup database 16 identifying the specified virtual copy as the source 74. If (at block 160) there is an incremental backup 70 for the specified virtual copy, then the backup database 16 determines (at block 162) a point-in-time of a last incremental backup for the specified virtual copy. The last incremental backup may comprise a full backup 26 of the specified virtual copy 22 or an incremental backup set 28 having changes between different points-in-time since the point-in-time of the specified virtual copy 22. The backup database 16 creates (at block 164) an incremental backup set 28 from the determined point-in-time (of the last formed incremental backup set) and a current time. The incremental backup may be formed by copying data in the data set 4 in storage 6 that was modified between the determined point-in-time and current time to an incremental backup set 28 in the backup storage 10.

If (at block 160) there are no incremental backups for the specified virtual copy indicated in the backup database 16, then the backup database 16 creates (at block 166) a first incremental backup comprising a full backup 26 of the data set represented by the virtual copy 22. The incremental backup 26 or 28 is copied (at block 168) to the backup storage 10. The backup database 16 may update the backup incremental backup repository 30 (at block 170) to indicate the incremental backup set.

The copy services 18 may further write (at block 172) information indicating that the requested incremental backup completed to the shared repository 20.

Figure 7:
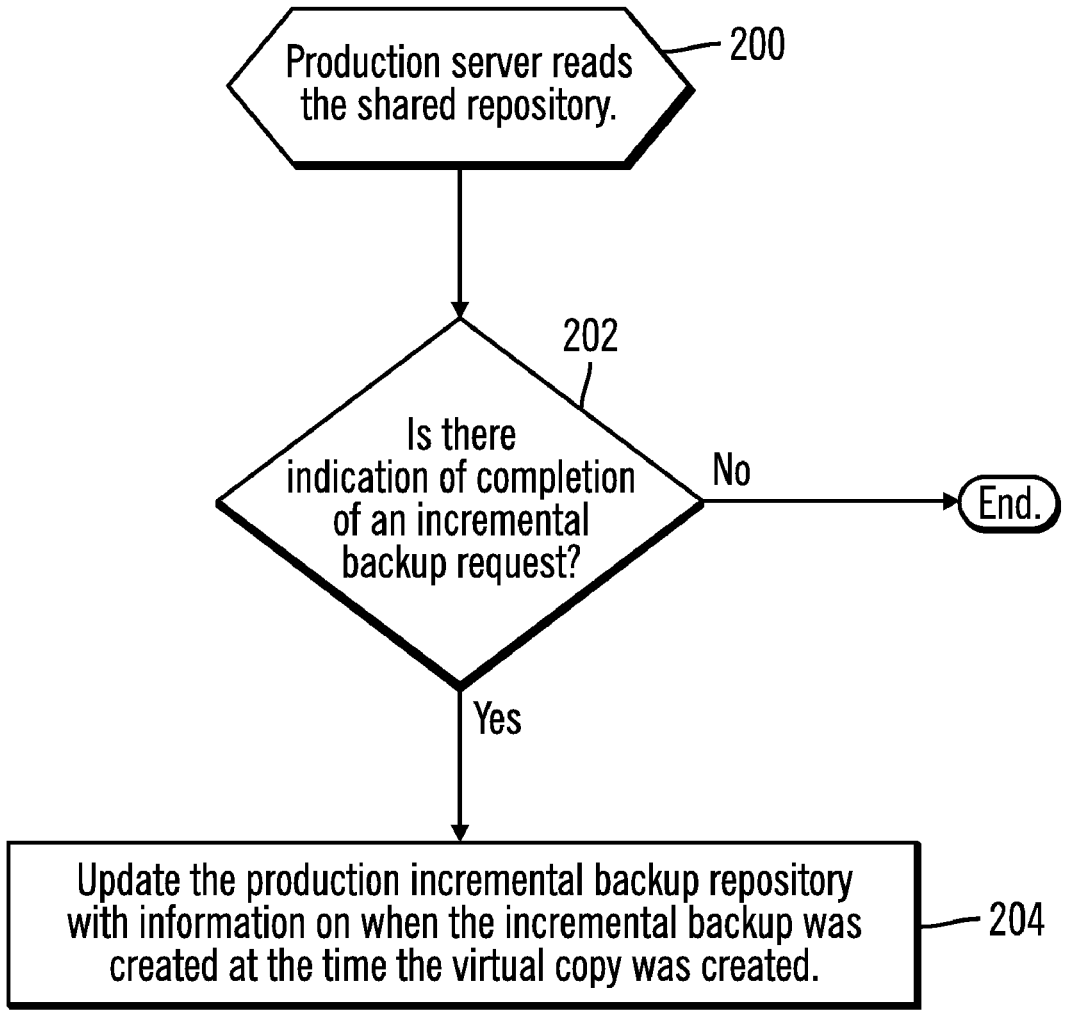
FIG. 7 illustrates an embodiment of operations by a production server to read a shared repository.

FIG. 7 illustrates an embodiment of operations performed by the production server copy services 12 to read the shared repository 20. In response to reading (at block 200) the shared repository 20, the copy services 12 determines (at block 202) whether there is indication of completion of an incremental backup request. If not, control ends. Otherwise, if there is such indication, then the copy services 12 updates (at block 204) the production incremental backup repository 32 to indicate that the incremental backup completed.

Figure 8:
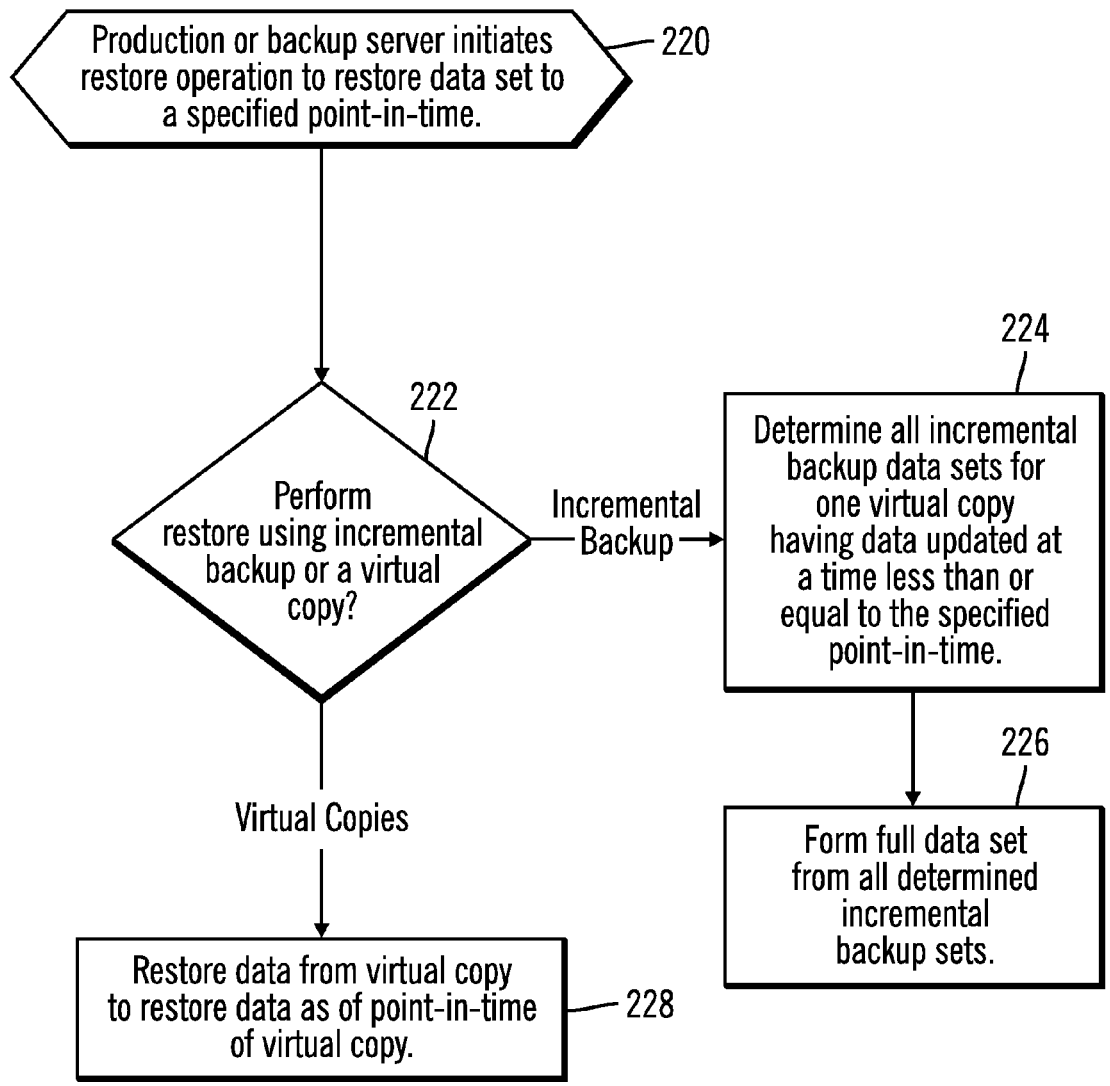
FIG. 8 illustrates an embodiment of operations to restore a data set.

FIG. 8 illustrates an embodiment of operations performed at the production 2 server by a user or application program to restore a data set 4 to the storage 6. A user (or application) may initiate the restore (at block 220) to restore using the virtual copies 22 or the incremental backups for a virtual copy 24. If (at block 222) the restore involves the incremental backups, then the production 8 database determines (at block 224) all incremental backup data sets. The user may specify the incremental backup sets to select by specifying a virtual copy, and then the production 6 database determines the incremental backup data sets 24 for the selected virtual copy 22. Alternatively, the user (or application) may determine the most recent incremental backups 24 and then select one group of incremental backups 24 providing incremental backups to a point-in-time to which the user wants to restore the data set 4. The production database 8 (or other component) may then form (at block 226) the full data set 5 from all determined incremental backup sets. If (at block 222) the restore involves the use of a selected virtual copy 22, then the production 12 or backup 18 copy services restores (at block 228) the data set from the virtual copy to the data set 4 as of the point-in-time of the selected virtual copy 22.

Described embodiments provide techniques for a production database 8 to maintain information on incremental backup operations completed by the backup server 16. With the described embodiments, the production server 2 may create backups according to two different backup methods and also perform restores for both methods, virtual copy and incremental backup. The backup server 14 may create an incremental backup 14 from a virtual copy 22 after the virtual copy 22 has been created.

Further, with the described embodiments, the incremental backup operation is offloaded from the production server 2 to the backup server 14. If the backup database 16 does not complete the incremental backup set operation, then the backup database 16 may retry the incremental backup without involving the production server 2. If the production database 8 maintains information on successfully created incremental backup sets 28, then the production database 8 will have information to allow a user or application to request an incremental backup as of a point-in-time for which an incremental backup set was not previously created by another backup database 16 because the production database 8 maintains information on previously created incremental backups for virtual copies 24.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 4, 5, 6, 7, and 8 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An article of manufacture comprising a computer readable storage medium including production code executed by a production server and backup code executed by a backup server to perform operations with respect to a storage and backup storage, the operations comprising:
    initiating, by the production code, a virtual copy operation to create a virtual copy in the backup storage of a data set in the storage, wherein the virtual copy represents the data set at a point-in-time copy, and wherein the virtual copy is completed without transferring the data set to a backup location;
    determining, by the backup code, whether an incremental backup has been created with respect to the virtual copy;
    creating a first incremental backup set comprising a full backup of the data set represented by the virtual copy as of the point-in-time of the virtual copy in response to determining that an incremental backup has not been created for the virtual copy; and
    initiating, by the backup code, an incremental backup operation with respect to the virtual copy in response to determining that an incremental backup has been created, wherein the incremental backup operation performs:
        determining a last incremental backup point-in-time comprising a point-in-time of a most recently created incremental backup set, wherein the most recently created incremental backup set comprises the first incremental backup set or an incremental backup set created subsequent to the creation of the first incremental backup set, and
        copying data in the data set in the storage that was modified between the determined last incremental backup point-in-time and a current time to a new incremental backup set.

2. The article of manufacture of claim 1, wherein the production server and backup server are in communication with a shared repository, further comprising:
    wherein the production code initiates the incremental backup operation by writing an incremental backup command to the shared repository indicating the identified virtual copy and one of a plurality of backup servers to execute the incremental backup command; and
    wherein the backup code processes the shared repository and reads the incremental backup command, and wherein only the backup server identified in the incremental backup command executes the incremental backup command.

3. The article of manufacture of claim 2, further comprising:
    writing, by the backup code that executed the incremental backup command, status indicating that the incremental backup command completed to the shared repository; and
    reading, by the production code, the shared repository, by a system that wrote the incremental backup command, the status indicating that the incremental backup command completed.

4. The article of manufacture of claim 1, wherein the production code further causes operations comprising:
    updating a production database maintained by the production server to indicate the virtual copy; and
    updating the production database to indicate that the incremental backup operation performed by the backup server completed.

5. The article of manufacture of claim 4, further comprising:
    writing, by the production code, information indicating the virtual copy to a shared repository;
    writing, by the production code, a request to create the incremental backup to the shared repository; and
    reading, by the backup code, the shared repository, wherein the backup server performs the incremental backup in response to reading from the shared repository the request to create the incremental backup.

6. The article of manufacture of claim 4, further comprising:
writing, by the backup code, information indicating that the requested incremental backup completed to a shared repository; and
reading, by the production code, the shared repository, wherein the production code updates the production database to indicate that the incremental backup completed in response to reading from the shared repository the information indicating that the requested incremental backup completed.

7. The article of manufacture of claim 6, further comprising:
restoring, by the production code, the data set using the information in the production database indicating the virtual copy and the incremental backup.

8. The article of manufacture of claim 1, further comprising:
creating, by the production code, additional virtual copies at additional point-in-times;
creating, by the backup code, additional incremental backups with respect to an identified one of the virtual copies, wherein a plurality of the incremental backups indicate changes to the data set represented by the identified virtual copy; and
restoring, by the production code, the data set using at least one of the incremental backups and/or at least one of the virtual copies.

9. A system in communication with a network, comprising:
a production server;
a backup server;
a storage including a data set;
a backup storage, wherein the production server, the backup server, the storage, and the backup storage communicate over a network;
production code executed by the production server to perform operations, the operations comprising:
  initiating a virtual copy operation to create a virtual copy in the backup storage of the data set in the storage, wherein the virtual copy represents the data set at a point-in-time copy, and wherein the virtual copy is completed without transferring the data set to a backup location;
backup code executed by the backup server to perform operations, the operations comprising:
  determining whether an incremental backup has been created with respect to the virtual copy;
  creating a first incremental backup set comprising a full backup of the data set represented by the virtual copy as of the point-in-time of the virtual copy in response to determining that an incremental backup has not been created for the virtual copy; and
  initiating an incremental backup operation with respect to the virtual copy in response to determining that an incremental backup has been created, wherein the incremental backup operation causes the backup code executed by the backup server to:
    determine a last incremental backup point-in-time comprising a point-in-time of a most recently created incremental backup set, wherein the most recently created incremental backup set comprises the first incremental backup set or an incremental backup set created subsequent to the creation of the first incremental backup set; and
    copy data in the data set in the storage that was modified between the determined last incremental backup point-in-time and a current time to a new incremental backup set.

10. The system of claim 9, further comprising:
a shared repository accessible to the production server and the backup server;
wherein the production code is executed by the production server to write an incremental backup command to the shared repository indicating the identified virtual copy and one of a plurality of backup servers to execute the incremental backup command,
wherein the backup code is executed by the backup server to process the shared repository and read the incremental backup command, wherein only the backup server identified in the incremental backup command executes the incremental backup command.

11. The system of claim 10, further comprising:
wherein the backup code is executed by the backup server that executed the incremental backup command to write status indicating that the incremental backup command completed to the shared repository; and
wherein the production code is executed by the production server to read from the shared repository the status indicating that the incremental backup command completed.

12. The system of claim 9, wherein the production code is executed by the production server to:
update a production database maintained by the production server to indicate the virtual copy; and
update the production database to indicate that the incremental backup operation performed by the backup server completed.

13. The system of claim 9, further comprising:
wherein the backup code is executed by the backup server to create additional incremental backups with respect to an identified one of the virtual copies, wherein a plurality of the incremental backups indicate changes to the data set represented by the identified virtual copy; and
wherein the production code is executed by the production server to:
  create additional virtual copies at additional point-in-times; and
restore the data set using at least one of the incremental backups and/or at least one of the virtual copies.

14. A computer implemented method, comprising:
initiating a virtual copy operation to create a virtual copy of a data set in a computer readable storage medium, wherein the virtual copy represents the data set at a point-in-time copy, and wherein the virtual copy is completed without transferring the data set to a backup location;
determining whether an incremental backup has been created with respect to the virtual copy;
creating a first incremental backup set comprising a full backup of the data set represented by the virtual copy as of the point-in-time of the virtual copy in response to determining that an incremental backup has not been created for the virtual copy; and
initiating an incremental backup operation with respect to the virtual copy in response to determining that an incremental backup has been created, wherein the incremental backup operation performs:
  determining a last incremental backup point-in-time comprising a point-in-time of a most recently created incremental backup set, wherein the most recently created incremental backup set comprises the first incremental backup set or an incremental backup set created subsequent to the creation of the first incremental backup set, and copying data in the data set in the storage that was modified between the determined last incremental backup point-in-time and a current time to a new incremental backup set.

15. The method of claim 14, wherein initiating the incremental backup operation comprises:

writing an incremental backup command to a shared repository indicating the identified virtual copy and one of a plurality of backup servers to execute the incremental backup command, wherein the backup servers process the shared repository and reads the incremental backup command, and wherein only the backup server identified in the incremental backup command executes the incremental backup command.

16. The method of claim 15, further comprising:

writing, by the backup server that executed the incremental backup command, status indicating that the incremental backup command completed to the shared repository; and reading the shared repository, by a system that wrote the incremental backup command, the status indicating that the incremental backup command completed.

17. The method of claim 14, wherein the operation to create the virtual copy is performed by a production server at which the data set is updated, and wherein the operation to create the incremental backup set is performed by a backup server, further comprising:

updating a database maintained by the production server to indicate the virtual copy; and updating the database to indicate that the incremental backup operation performed by the backup server completed.

18. The method of claim 14, further comprising:

creating additional virtual copies at additional point-in-times;

creating additional incremental backups with respect to an identified one of the virtual copies, wherein a plurality of the incremental backups indicate changes to the data set represented by the identified virtual copy; and restoring the data set using at least one of the incremental backups and/or at least one of the virtual copies.

* * * * *